United States Patent
Koban et al.

(10) Patent No.: US 11,906,109 B2
(45) Date of Patent: Feb. 20, 2024

(54) METHOD FOR DISPLAYING A FILL LEVEL OF A PRESSURE VESSEL, AND PRESSURE VESSEL ASSEMBLY

(71) Applicant: Bayerische Motoren Werke Aktiengesellschaft, Munich (DE)

(72) Inventors: Markus Koban, Pfaffenhofen an der Ilm (DE); Andreas Pelger, Ismaning (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/797,897

(22) PCT Filed: Feb. 8, 2021

(86) PCT No.: PCT/EP2021/052925
§ 371 (c)(1),
(2) Date: Aug. 5, 2022

(87) PCT Pub. No.: WO2021/156502
PCT Pub. Date: Aug. 12, 2021

(65) Prior Publication Data
US 2023/0107671 A1    Apr. 6, 2023

(30) Foreign Application Priority Data

Feb. 6, 2020  (DE) ...................... 10 2020 102 998.5

(51) Int. Cl.
*F17C 13/02*      (2006.01)
*B60K 15/03*      (2006.01)

(52) U.S. Cl.
CPC ...... *F17C 13/025* (2013.01); *B60K 15/03006* (2013.01); *B60K 2015/03019* (2013.01); *F17C 2250/043* (2013.01); *F17C 2250/0408* (2013.01)

(58) Field of Classification Search
USPC ........................................................... 141/18
See application file for complete search history.

(56) References Cited

U.S. PATENT DOCUMENTS

| | | | |
|---|---|---|---|
| 9,360,353 B2 * | 6/2016 | Hagen ....................... G01F 1/36 |
| 2002/0194911 A1 | 12/2002 | Allegre et al. | |
| 2015/0211914 A1 * | 7/2015 | Dudar .............. B60K 15/03006 73/292 |

FOREIGN PATENT DOCUMENTS

| | | |
|---|---|---|
| DE | 10 2013 001 887 A1 | 8/2014 |
| DE | 10 2013 014 886 A1 | 3/2015 |

(Continued)

OTHER PUBLICATIONS

DE 102017005969 A1 (English Translation) (Year: 2018).*

(Continued)

*Primary Examiner* — Timothy P. Kelly
*Assistant Examiner* — Christopher M Afful
(74) *Attorney, Agent, or Firm* — Crowell & Moring LLP

(57) ABSTRACT

A method for displaying a fill level of a pressure vessel includes measuring an actual fill level of the pressure vessel, calculating a displayable fill level based on the actual fill level, and displaying the displayable fill level via a display device. In the method, during refueling between a first filling point (FP1) and a second filling point (FP2), the displayable fill level is increased in relation to the actual fill level in accordance with a predefined characteristic curve.

17 Claims, 3 Drawing Sheets

(56) References Cited

FOREIGN PATENT DOCUMENTS

| DE | 10 2015 217 084 A1 | 3/2017 |
| DE | 10 2017 005 969 A1 | 12/2018 |
| DE | 102017005969 A1 * | 12/2018 |

OTHER PUBLICATIONS

International Search Report (PCT/ISA/210) issued in PCT Application No. PCT/EP2021/052925 dated May 12, 2021 with English translation (six (6) pages).
German-language Written Opinion (PCT/ISA/237) issued in PCT Application No. PCT/EP2021/052925 dated May 12, 2021 (six (6) pages).
German-language Search Report issued in German Application No. 10 2020 102 998.5 dated Dec. 20, 2020 with partial English translation (12 pages).
Anonymous, "Why 'Filling-it-up' Takes More Than 'Tank Capacity'—ScienceDaily," Oct. 26, 2005, Retrieved from the Internet: https://www.sciencedaily.com/releases/2005/10/051023120710.htm, XP055800576 (three (3) pages).

* cited by examiner

METHOD FOR DISPLAYING A FILL LEVEL OF A PRESSURE VESSEL, AND PRESSURE VESSEL ASSEMBLY

BACKGROUND

The technology disclosed relates to a method for displaying a fill level of a pressure vessel and an associated pressure vessel assembly.

Pressure vessels can be used, for example, in motor vehicles or in other units to store gaseous fuel. Such pressure vessels can be refueled, for example, according to the norm SAEJ2601. It is typically the goal here to reach a fill level (state of charge, SoC) between 95% and 100% at the end of the refueling. A value 100% typically means a full refueling, less than 95% would accordingly reduce the range. However, filling stations are known which already switch off earlier, for example, at a SoC of 93%.

It can thus be that the fill level is below 100% after a regular refueling. This can result in uncertainty in the customers or in measures for remedying a supposed error state, although there is no error.

SUMMARY

It is one preferred object of the technology disclosed here to reduce or remedy at least one disadvantage of a previously known solution or to propose an alternative solution. It is in particular one preferred object of the technology disclosed here to provide a method which gives the driver feedback in typical refueling situations, which does not cause him to suspect an error state. Further preferred objects can result from the advantageous effects of the technology disclosed here. The objects are achieved by the subject matter of the embodiments of the invention disclosed herein.

The technology disclosed here relates to a method for displaying a fill level of a pressure vessel. The method comprises the following steps:

measuring an actual fill level of the pressure vessel,
calculating a fill level to be displayed based on the actual fill level, and
displaying the fill level to be displayed by means of a display device.

It is possible by means of the method to decouple the fill level to be displayed from the actual fill level. A fill level to be displayed can thus be displayed to the driver, which deviates from the actual fill level and, for example, is adjusted in such a way that the driver does not suspect an error state in typical refueling situations which were carried out properly. Exemplary embodiments are described hereinafter.

The fill level to be displayed is expediently increased in accordance with a predefined characteristic curve in relation to the actual fill level between a first filling point and a second filling point. Such a characteristic curve can in particular be a deterministic relationship between actual fill level and fill level to be displayed. In particular, the characteristic curve can be independent of further parameters, so that in particular no other measured variables or other influences also determine the relationship between actual fill level and fill level to be displayed. In particular, the characteristic curve can be used independently of a recognition of a specific event, for example, a refueling recognition.

The first filling point and the second filling point can be in particular values of the actual fill level, which are below a maximum filling. The second filling point can also correspond to a maximum filling. In particular, it is possible by way of the characteristic curve to avoid the fill level to be displayed suddenly being set to a value of 100% or a display of a full fill level, which could be perceived as unnatural behavior.

The pressure vessel can be used in particular for storing fuel that is gaseous under ambient conditions. It can be installed in particular in a motor vehicle, for example, a passenger vehicle, a motorcycle, or a utility vehicle. The pressure vessel can be used, for example, in a motor vehicle which is operated using compressed natural gas (CNG) or liquid natural gas (LNG) or using hydrogen. The pressure vessel is typically fluidically connected to at least one energy converter, which is configured to convert the chemical energy of the fuel into other forms of energy.

The pressure vessel can be designed in particular as a composite overwrapped pressure vessel. It can be, for example, a high-pressure gas vessel. High-pressure gas vessels are designed to continuously store fuel at ambient temperatures at a nominal operating pressure (also called nominal working pressure or NWP) of at least 350 bar (gauge)(=overpressure in relation to the atmospheric pressure) or at least 700 bar (gauge).

The fill level of a pressure vessel is typically a measure of the amount of fuel which is stored in the pressure vessel. The fill level is to be viewed in the scope of this disclosure as a percentage value which results from the amount actually stored in the pressure vessel and the maximum and possibly also minimum storage amounts. It can also be a percentage value of maximum fuel storage pressure or density or of the difference between maximum and minimum fuel storage pressure or density. The maximum fuel storage pressure is generally reached when the pressure vessel has reached the nominal operating pressure (of, for example, 700 bar (gauge) at nominal operating temperature of, for example, 15° C.) under normal conditions. The minimum fuel storage pressure can be a fixed minimum value, which is generally specific to the container, or can be the atmospheric pressure. Similarly, the maximum fuel storage density or the minimum fuel storage density result in these normal conditions. In a 70 MPa pressure vessel, for example, the maximum storage density in the case of hydrogen at a temperature of 15° C. can be approximately 40.22 g/L. The fill level can be determinable directly or indirectly. The lower fill level can be, for example, a fill level which corresponds to a minimum fuel storage pressure or a minimum fuel storage density in the pressure vessel. For example, the lower fill level can be a fuel pressure which is always to be present, for example, 5 bar or 10 bar or 20 bar. Such a value can also be predefined under certain circumstances to reduce structural damage to the pressure vessel. Alternatively, the lower fill level can correspond to a fuel storage pressure or a fuel storage density which has a certain safety margin from the minimum fuel storage pressure or from a minimum fuel storage density.

The actual fill level can be measured, for example, by means of a sensor and an associated calibration. Such a calibration can be in particular a calibration that remains uniform for a longer time period. The calculation of the fill level to be displayed, in contrast, in particular takes place during operation.

The embodiments just described with respect to a fill level relate in particular to the actual fill level of the pressure vessel. This is that fill level which is actually present and usable and which would also be displayed unchanged without the calculation step, thus in embodiments according to the prior art. This would mean, for example, that for the case in which a filling station only fills the pressure vessel to 95% of its maximum fill level, a value of 95% would actually be displayed, which can possibly have the result, however, that the driver suspects a malfunction.

The display device can be, for example, a digital display or another display on an instrument panel. The display device can also include means, for example, to transmit the fill level to be displayed to another unit, for example, a mobile telephone, wherein, for example, a driver can hold such a mobile telephone in the hand during the refueling and can thus monitor the refueling process.

Preferably, the fill level to be displayed is increased or remains equal in comparison to the actual fill level upon the calculation. This is based on the finding already described at the outset, that it is reasonable in certain situations to display a higher fill level than is actually present in order to not give the driver the impression of a malfunction for the case in which a filling station does not refuel to 100% of the maximum possible fill level. However, it can also be reasonable in specific ranges that the fill level to be displayed is set equal to the actual fill level, so that a realistic fill level value is displayed. In particular, the method can thus be executed in such a way that in principle the fill level to be displayed is either increased or remains equal upon the calculation.

It is to be understood that specification of the fill level to be displayed increasing or remaining equal in comparison to the actual fill level relates to a static observation, i.e., in a specific moment the fill level to be displayed is greater than or equal to the actual fill level. This is not to be confused with a dynamic observation, i.e., it cannot be directly inferred from the specified relationship whether the fill level to be displayed rises or falls faster or slower than the actual fill level.

The calculation during refueling preferably takes place differently from the calculation during withdrawal. For example, respective forms and/or algorithms can be predefined to calculate the fill level to be displayed based on the actual fill level during the refueling, on the one hand, and during the withdrawal, on the other hand. However, the calculation can also take place identically during the refueling as during withdrawal.

A refueling is understood in particular as a process which introduces gaseous fuel into the pressure vessel. The internal pressure of the pressure vessel typically increases here and/or the mass of gas stored in the pressure vessel increases. For example, any time period outside a refueling can be considered to be a withdrawal, since there is the possibility in principle in this time period to withdraw gas from the pressure vessel in order to use it. In the narrower sense, a withdrawal can also be understood as an actual operation of a motor vehicle with gas consumption. In this case, the calculation can take place differently than during the refueling. This can enable an optimization of the method.

According to one preferred embodiment, during the refueling, the fill level to be displayed is increased according to a predefined characteristic curve in relation to the actual fill level between a first filling point and a second filling point. The predefined characteristic curve can be a mathematical relationship which specifies the calculation of the fill level to be displayed as a function of the actual fill level. The first filling point and the second filling point are, like all other filling points mentioned herein, specific values of the actual fill level which incorporate the calculation rules described here or other features. These can be statically predefined or also can dynamically change. In particular, they can be less than 100% or than a complete filling. The behavior of a fill level display can be specified by predefining the characteristic curve so that the best possible effect is achieved.

The second filling point is in particular greater than the first filling point. The first filling point can also be at 0%, however, it can in particular also assume a higher percentage value.

According to one embodiment, the fill level to be displayed corresponds to the actual fill level during the refueling below the first filling point. The actual fill level can thus be used unchanged as the fill level to be displayed at actual fill levels which are between 0% and the first filling point, since in such a range of the actual fill level only an increase of the fill level is typically observed during the refueling, which is still significantly below the maximum fill level, and therefore an error state cannot yet be concluded. A change of the fill level to be displayed in comparison to the actual fill level is thus typically not yet displayed below the first filling point.

According to one embodiment, the characteristic curve extends linearly between a first fill level value at the first filling point and a second fill level value at the second filling point. A linear increase of the fill level to be displayed in comparison to the actual fill level can thus be achieved, by which a sliding transition is enabled. The fill level to be displayed can typically extend between the first filling point and the second filling point as a function of the actual fill level in the form of a straight line, which typically has a slope >1. The above-mentioned increase is thus achieved.

Profiles of the characteristic curve other than linear profiles are also possible, however. For example, the characteristic curve can be defined in the form of a function defined in sections having, for example, two or more different slopes between the first filling point and the second filling point. It is also possible, for example, to use a polynomial, for example, a second-degree, third-degree, or higher degree polynomial. Such polynomials can also be defined in sections.

According to one embodiment, during the refueling between the second filling point and a third filling point, the fill level to be displayed is calculated linearly between a second fill level value at the second filling point and 100% at the third filling point. A simple linear profile can thus again be used between second filling point and third filling point, wherein 100% is displayed at the third filling point. It is thus suggested to the driver that he has refueled fully when the third filling point is reached. This is typically a predefined value which, for example, most filling stations or a specific filling station also actually reach, so that a fill level of 100% is displayed during typical refueling processes.

The second fill level value can in particular correspond to the ratio of second filling point to third filling point. In this way, the second fill level value lies on a zero point straight line, which connects a fill level of 0% to be displayed at an actual fill level of 0% to a fill level of 100% to be displayed at an actual fill level of the third fill level value. A higher slope could result, for example, in a faster dynamic increase of the fill level to be displayed at the end of a refueling, which could cause irritation. A lesser slope could also result in an unnaturally slow dynamic increase, which could also cause irritation. The embodiment just described has therefore proven to be particularly advantageous.

The characteristic curve particularly preferably assigns a fill level to be displayed to each actual fill level. This can in particular take place in a deterministic manner, thus independently of other parameters, measured variables, or influencing factors.

The characteristic curve can in particular entirely or partially have a slope >1. Therefore, in particular a higher fill level value is displayed along the characteristic curve than is actually present, but a value of 100% or complete filling is not yet displayed. The slope relates in particular to the fill level to be displayed as a function of the actual fill level.

In particular, the characteristic curve can reach a second fill level value, which is less than 100%, at the second filling point. In comparison to embodiments which immediately display jumps to full refueling, more realistic feedback on the refueling can thus be given to the driver.

After each refueling, a maximum actual fill level achieved in this case is preferably stored at a filling station, and during the next refueling, preferably the last maximum actual fill level reached at the respective filling station or a value which is calculated based on maximum actual fill levels previously reached at this filling station is used as the third filling point. The third filling point can thus be used specifically by filling station, i.e., for each filling station which is driven to for refueling, an adjusted third filling point can be used. It is thus possible to avoid the third filling point being set excessively high or excessively low. A filling station can be identified, for example, by satellite navigation or other navigation methods, or also by specific identification features such as barcodes or identifiers of an infrared interface. During the next refueling, the last maximum actual fill level reached at the respective filling station or a value which is calculated based on maximum actual fill levels previously reached at this filling station can also be used as the filling point, from which a fill level of 100% to be displayed is calculated. In particular, even in the case of greater actual fill levels than this filling point, a fill level of 100% is then also calculated and displayed. The display can thus be adjusted specifically by filling station, and in particular independently of the characteristic curve. The calculation of the value can be carried out, for example, as the mean value from the maximum actual fill levels reached.

The fill level to be displayed is preferably 100% upon refueling above the second filling point or above the third filling point. This can be accepted since typically it is not possible to refuel far beyond the third filling point and thus a value of 100% is only displayed to the driver for a short time period. The value can in particular then be set to 100% above the third filling point when the second filling point is less than the third filling point and, for example, a linear dependence of the fill level to be displayed on the actual fill level is used between second filling point and third filling point, as described above. However, if the characteristic curve ends at a value at which an actual fill level of 100% is displayed, the second filling point can thus be set equal to the third filling point, for example, and it can be presumed that the fill level to be displayed is 100% above the second filling point.

If, after the end of a refueling, a predefined actual fill level was not reached, for example, the actual fill level can be used as the fill level to be displayed. The incomplete refueling can thus be openly communicated to the driver for the case in which a predefined fill level was not reached, which should have been reached, so that the driver is aware of the incomplete refueling. A malfunction can thus be identified, for example, and/or the driver can adjust to the possibly reduced range. This applies independently of a possible range display, which is preferably dependent on the actual fill level and which will be discussed in more detail hereinafter. The predefined actual fill level can be permanently stored or variably defined, for example. It can be understood in particular as a threshold value. It can be less than 100% in particular.

In particular in this case, for example, a sliding temporal transition of the fill level to be displayed can be used. During the refueling follow-up, thus, for example, before the customer has decoupled, the fill level to be displayed can be continuously equalized to the actual fill level. Alternatively, for example, this can also take place in the time after the decoupling, generally at the same time as the closing of the tank flap and starting of a consumer or also in another time period.

According to one embodiment, the fill level to be displayed is calculated by means of a fourth filling point and a fifth filling point during withdrawal. The fourth filling point can correspond to the actual fill level reached during a refueling. The fifth filling point can be predefined, thus, for example, can be permanently stored or adjusted specifically by filling station. Between the fifth filling point and the fourth filling point, for example, the filling point to be displayed can extend linearly between 100% at the fourth filling point and a fifth fill level value at the fifth filling point. Immediately upon beginning the withdrawal, i.e., when gas is withdrawn by a consumer from the pressure vessel and consumed, this consumption can be communicated with respect to the driver, wherein the actual fill level is not yet displayed in the case of high actual fill levels. Rather, a higher value is still displayed, which avoids excessively sudden jumps in the fill level display. A profile other than a linear profile can also be used, however, as was described above for the characteristic curve, for example.

During withdrawal, for example, below the fifth filling point, the fill level to be displayed can correspond to the actual fill level. Therefore, when sufficient gas has already been withdrawn from the pressure vessel and thus the modifications are hardly still perceptible, the actual fill level is displayed, which enables a more realistic range estimation for the driver at low fill levels, for example. In particular, the driver can establish a more realistic relationship between fill level and displayed range here, if such a range is calculated and displayed.

According to one preferred embodiment, a range is furthermore calculated and displayed based on the actual fill level. The range calculation can thus be independent of the above-described calculation of a fill level to be displayed, i.e., the actual fill level is always used for the range calculation. In the range calculation, a possible difference between the maximum refueling and a somewhat lesser actually achieved refueling is less in percent than in the case of the fill level display.

Other values, for example, present consumption, for example, of the last minutes or kilometers, or also other values such as an average consumption or other data can in particular also be incorporated in the range calculation.

The technology disclosed here furthermore relates to a pressure vessel arrangement having a pressure vessel, a device for measuring an actual fill level of the pressure vessel, a display device, and an electronic control device, which is configured to execute a method disclosed here. All embodiments and variants described herein can be used with respect to the method.

The device for measuring an actual fill level can be embodied, for example, in the form of a pressure sensor. The display device can be embodied, for example, in the form of a digital display.

In other words, it can be provided that a fill level display and a range calculation are decoupled from one another. A storage device which has reached, for example, a fill level of 93% or 95% is accordingly assessed as fully refueled and also accordingly displayed to the driver. However, the actual fill level, i.e., the actual gas storage amount, for example, hydrogen storage amount, can be taken into consideration for the range calculation. In order that the customer is not confused by the different values (real range, which corresponds to a specific gas mass dependent on the consumption, and the range), a sliding correction calculation of the displayed fill level can be introduced.

The display of the fill level to be displayed for the driver typically has the unit percent [%]. The actually refueled tank mass is typically provided in kilograms. An exemplary embodiment for how the fill level to be displayed can be calculated as a function of the actual fill level is described hereinafter with reference to the figures.

The technology disclosed here will be explained on the basis of the figures. In the figures, in which:

DETAILED DESCRIPTION

Figure 1:
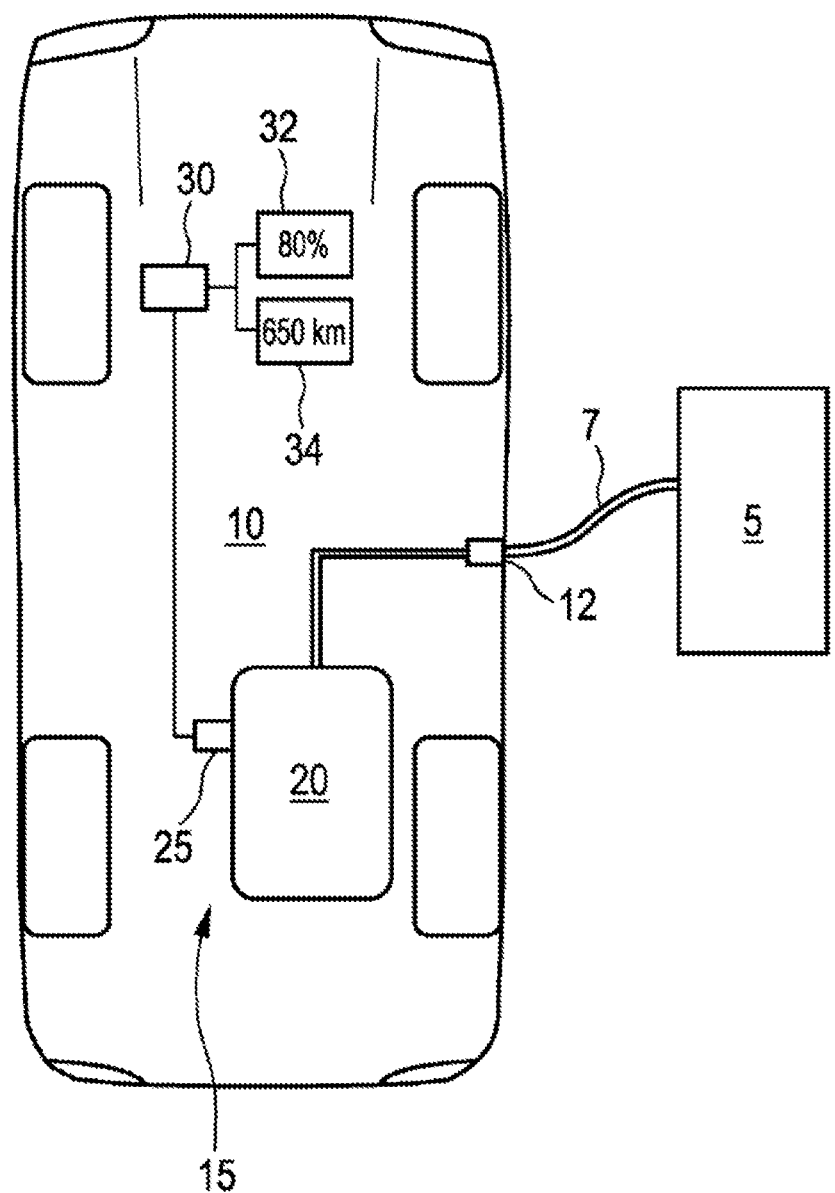
FIG. 1 shows a motor vehicle.

FIG. 1 shows a motor vehicle 10, which is connected to a filling station 5 for refueling. The filling station 5 has a refueling hose 7 for this purpose, which is connected to a connecting piece 12 of the motor vehicle 10.

The motor vehicle 10 has a pressure vessel arrangement 15, which comprises a pressure vessel 20, a pressure sensor 25 attached thereto, a control device 30, a first display device 32, and a second display device 34. The pressure sensor 25 can ascertain an internal pressure of the pressure vessel 20 and thus represents a device for ascertaining an actual fill level. A value displayed for this purpose is supplied to the control device 30, which converts the actual fill level into a fill level to be displayed, in a way as described hereinafter with reference to FIGS. 2 and 3. The fill level to be displayed is displayed on the first display device 32 as a percentage value. Furthermore, the control device 30 also carries out a range calculation, which is based in principle on the actual fill level. The corresponding range is displayed in kilometers on the second display device 34. The display devices 32, 34, which are shown separately here, can also be combined.

Figure 2:
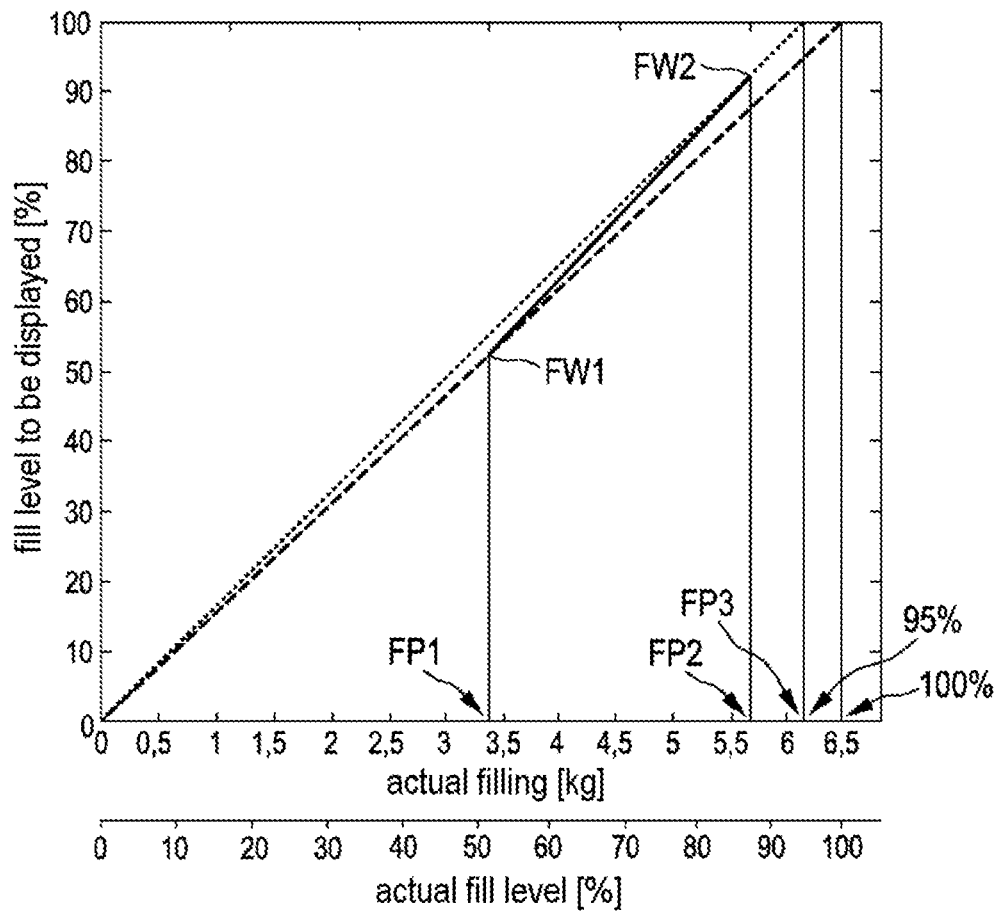
FIG. 2 shows a relationship between fill level to be displayed and actual fill level during the refueling.

FIG. 2 shows a relationship between fill level to be displayed and an actual fill level, wherein both the actual filling in kilograms and also an associated percentage value of the actual fill level from 0% to 100% is indicated here.

A first filling point FP1, a second filling point FP2, and a third filling point FP3 are arranged on the horizontally plotted axis of the actual fill level. These are predefined values which can be permanently programmed in or can also be adjusted specifically by filling station. The third filling point FP3 is at an actual fill level of 95%, as shown. Furthermore, a complete filling, i.e., 100% actual fill level, is also shown. In the present case, this is at 6.5 kg. This represents a solely exemplary value.

Below the first filling point FP1, the fill level to be displayed corresponds to the actual fill level. This is shown by the dashed line. Between first filling point FP1 and second filling point FP2 having assigned fill level values FW1 and FW2, the fill level to be displayed extends as a function of the actual fill level along a characteristic curve, which is shown by a solid line. The characteristic curve has a linear profile in the present case having a slope >1, wherein it is to be noted that the characteristic curve can also be embodied differently. In the region between first filling point FP1 and second filling point FP2, an adjustment thus takes place which has the result that a successively higher value is displayed than is actually present. Between second filling point FP2 and third filling point FP3, the fill level to be displayed as a function of the actual fill level again extends linearly, but with a lesser slope, which is shown by the dotted curve. Above the third filling point FP3, a fill level to be displayed of 100% is fundamentally displayed, so that a further refueling can no longer be recognized by the driver.

The dashed line and the dotted line are also shown outside those regions in which they indicate the actual relationship between fill level to be displayed and actual fill level. The dashed line corresponds to the identity function. The dotted line corresponds to the connection between zero point and a fill level of 100% to be displayed at the third filling point FP3.

Due to the described embodiment, a refueling up to the third filling point FP3 is already perceived by the driver as complete refueling and thus an incomplete refueling, which is permissible according to SAE norm, is not perceived as an error.

As shown, the fill level to be displayed at the second filling point FP2 has a second fill level value FW2. This lies on one of the dotted straight lines, which means that its ratio to 100% corresponds to that of the second filling point FP2 to the third filling point FP3. An ideal relationship between fill level to be displayed and actual fill level is thus achieved in the upper region.

Figure 3:
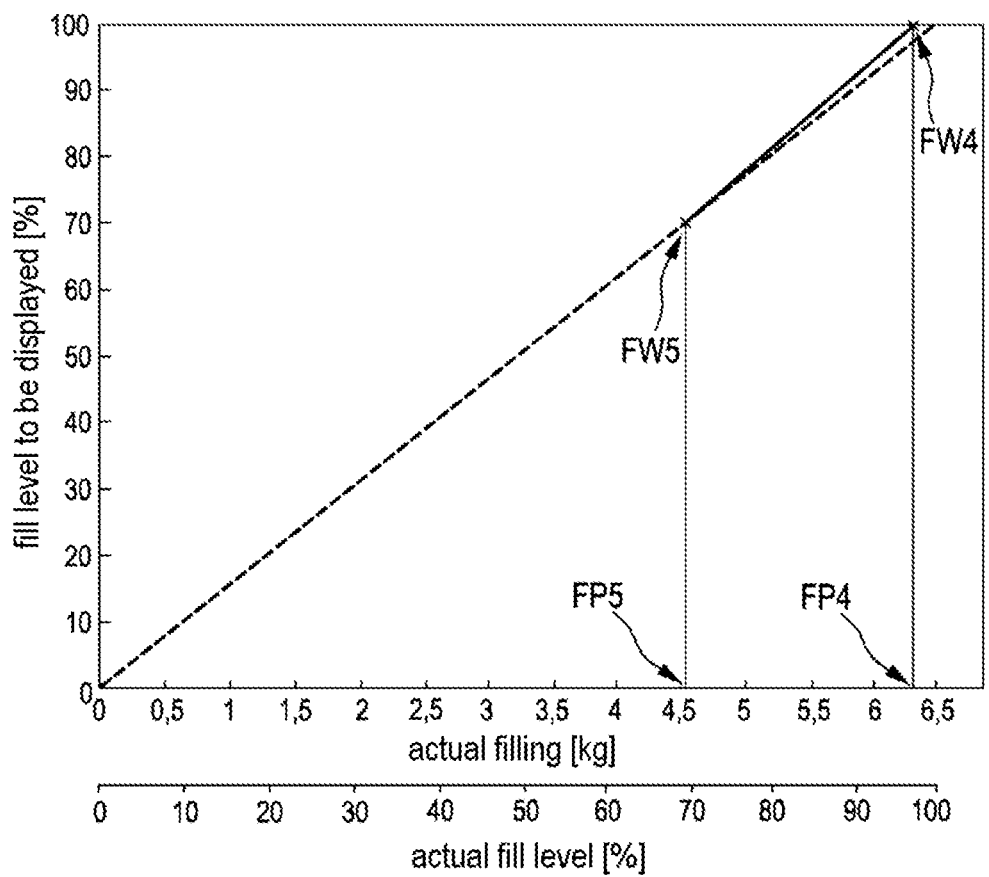
FIG. 3 shows a relationship between fill level to be displayed and actual fill level during withdrawal.

FIG. 3 shows the relationship between fill level to be displayed and actual fill level upon withdrawal. This can take place, for example, during an actual active operation of the motor vehicle 10, or also during idle phases outside a refueling.

The actual fill level reached during the refueling is now defined as the fourth filling point FP4. This can therefore be redefined after each refueling. Between the fourth filling point FP4, at which the display of the fill level to be displayed is 100% (shown as the fourth fill level value FW4), and a fifth filling point FP5, the relationship between fill level to be displayed and actual fill level extends linearly along the solid line, which has a slope >1. The fill level to be displayed thus drops more strongly than the actual fill level, which means a successive equalization to the actual fill level. Below the fifth filling point FP5 having its fifth fill level value FW5, the fill level to be displayed corresponds to the actual fill level, so that realistic feedback about the actual fill level is given to the driver, which allows him, for example, a more accurate estimation of the range.

If the filling station should already end the refueling before reaching the third filling point FP3, for example, due to a malfunction or due to a customer intervention, an adjustment of the display to the actually reached fill level can also take place. This transition can preferably be filtered or temporally smoothed, to avoid jumps in the display. Such an adjustment can take place, for example, at the end of a refueling (no pressure increase), while the follow-ups such as a pressure relief of a refueling hose and a release of a nozzle are still performed on the filling station side and the customer generally does not yet observe the fill level display.

Overall, the most suitable possible fill level display can be given to the driver by the embodiment described here, which is only modified insofar that the driver does not recognize a possibly incomplete refueling, which still corresponds to the norm, however, as a malfunction.

For reasons of readability, the expression "at least one" was partially omitted for simplification. If a feature of the technology disclosed here is described in the singular or undefined (for example, the/a pressure vessel, the/a sensor, etc.), the plural thereof is therefore also to be disclosed simultaneously (for example, the at least one pressure vessel, the at least one sensor, etc.).

The preceding description of the embodiments of the present invention is used only for illustrative purposes and not for the purpose of restricting the embodiments of the present invention. Various changes and modifications are possible in the context of the embodiments of the present invention without leaving the scope of the invention and its equivalents.

LIST OF REFERENCE SIGNS

FP: filling point
FW: fill level value
5: filling station
7: refueling hose
10: motor vehicle
15: pressure vessel arrangement
20: pressure vessel
30: control device
32: first display device
34: second display device

The invention claimed is:

1. A method for displaying a fill level of a pressure vessel, comprising:
measuring an actual fill level of the pressure vessel;
calculating a displayable fill level based on the actual fill level; and
displaying the displayable fill level via a display device, wherein
during refueling between a first filling point (FP1) and a second filling point (FP2), the displayable fill level is increased in relation to the actual fill level in accordance with a predefined characteristic curve, wherein
the predefined characteristic curve is used independently of other measured variables to determine the relationship between the actual fill level and the displayable fill level.

2. The method according to claim 1, wherein during the calculation the displayable fill level is increased or remains equal in comparison to the actual fill level.

3. The method according to claim 2, wherein the calculation during the refueling takes place differently from the calculation during withdrawal.

4. The method according to claim 3, wherein during refueling below the first filling point (FP1), the displayable fill level corresponds to the actual fill level.

5. The method according to claim 4, wherein the characteristic curve extends linearly between a first fill level value (FW1) at the first filling point (FP1) and a second fill level value (FW2) at the second filling point (FP2).

6. The method according to claim 5, wherein during refueling between the second filling point (FP2) and a third filling point (FP3), the displayable fill level is calculated linearly between a second fill level value (FW2) at the second filling point (FP2) and 100% at the third filling point (FP3).

7. The method according to claim 6, wherein the second fill level value (FW2) corresponds to a ratio of the second filling point (FP2) to the third filling point (FP3).

8. The method according to claim 7, wherein the characteristic curve assigns the displayable fill level to each actual fill level.

9. The method according to claim 8, wherein the characteristic curve entirely or partially has a slope >1.

10. The method according to claim 9, wherein the characteristic curve reaches the second fill level value (FW2), which is less than 100%, at the second filling point (FP2).

11. The method according to claim 10, wherein after each refueling at a filling station, a maximum actual fill level reached is stored, and
in a next refueling, a last maximum actual fill level reached at the filling station or a value which is calculated based on maximum actual fill levels previously reached at the filling station is used as the third filling point (FP3) and/or as a filling point from which the displayable fill level of 100% is calculated.

12. The method according to claim 11, wherein the displayable fill level is 100% during refueling above the second filling point (FP2) or above the third filling point (FP3).

13. The method according to claim 12, wherein, if after an end of a refueling, a predefined actual fill level is not reached, the actual fill level is used as the displayable fill level.

14. The method according to claim 13, wherein
during withdrawal the displayable fill level is calculated via a fourth filling point (FP4) and a fifth filling point (FP5),
the fourth filling point (FP4) corresponds to the fill level actually reached during a refueling and the fifth filling point (FP5) is predefined, and
between the fifth filling point (FP5) and the fourth filling point (FP4), the displayable fill level extends linearly between 100% at the fourth filling point (FP4) and a fifth fill level value (FW5) at the fifth filling point (FP5).

15. The method according to claim 14, wherein during withdrawal below the fifth filling point (FP5), the displayable fill level corresponds to the actual fill level.

16. The method according to claim 15, further comprising calculating a range based on the actual fill level and the displayed fill level.

17. A pressure vessel arrangement, comprising:
a pressure vessel;
a device configured to measure an actual fill level of the pressure vessel;
a display device; and
an electronic control device that is configured to execute a method according to claim 16.

* * * * *